United States Patent
Fabre et al.

(10) Patent No.: US 11,293,296 B2
(45) Date of Patent: Apr. 5, 2022

(54) METHOD FOR MANUFACTURING AN ANNULAR CASING EQUIPPING A TURBOMACHINE

(71) Applicant: SAFRAN AIRCRAFT ENGINES, Paris (FR)

(72) Inventors: Hubert Jean Marie Fabre, Melun (FR); Pauline Nathalie Six, Paris (FR); Marc-Emmanuel Jean Francois Techer, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 252 days.

(21) Appl. No.: 16/303,555

(22) PCT Filed: May 18, 2017

(86) PCT No.: PCT/FR2017/051197
§ 371 (c)(1),
(2) Date: Nov. 20, 2018

(87) PCT Pub. No.: WO2017/203134
PCT Pub. Date: Nov. 30, 2017

(65) Prior Publication Data
US 2020/0025017 A1      Jan. 23, 2020

(30) Foreign Application Priority Data
May 24, 2016   (FR) ...................... 1654606

(51) Int. Cl.
B29C 63/00      (2006.01)
F01D 11/12      (2006.01)
F01D 25/24      (2006.01)

(52) U.S. Cl.
CPC ........ *F01D 11/122* (2013.01); *B29C 63/0069* (2013.01); *F01D 25/24* (2013.01); *F05D 2230/60* (2013.01)

(58) Field of Classification Search
CPC . B29C 70/088; B29C 70/86; F05D 2300/603; F05D 2300/701; F05D 2220/323; F05D 2230/90
See application file for complete search history.

(56) References Cited

U.S. PATENT DOCUMENTS

| 4,329,308 A | | 5/1982 | Langer et al. | |
| 6,109,843 A | * | 8/2000 | Descoteaux | ............ B23P 6/002 29/402.02 |

(Continued)

FOREIGN PATENT DOCUMENTS

| EP | 2418387 A1 | 2/2012 |
| EP | 2886804 A1 | 6/2015 |

(Continued)

OTHER PUBLICATIONS

Written Opinion received for PCT Patent Application No. PCT/FR2017/051197, dated Sep. 15, 2017, 5 pages of Original Document Only.

(Continued)

*Primary Examiner* — Alison L Hindenlang
*Assistant Examiner* — Debjani Roy
(74) *Attorney, Agent, or Firm* — Womble Bond Dickinson (US) LLP

(57) ABSTRACT

The invention relates to a method for manufacturing a carrying casing (12) provided with a collar (18) for supporting at least one cartridge of abradable material for a turbomachine, said carrying casing (12) comprising at least one bare annular casing (16) and one block of honeycomb material (20) that comprises an outer face (22) configured to (Continued)

be secured to an inner face (24) of said bare annular casing (16), said block being covered with a skin (26), characterized in that it comprises successively: —a step in which the outer face (22) of the block (20) is secured to the inner face (24) of the bare annular casing (16), —a step in which the circularity of San inner face (32) of the block (20) is monitored and in which, if necessary, the inner face (32) of the block (20) is machined to round, —a step in which, simultaneously, said skin (26) is produced and is secured to said block (20).

7 Claims, 4 Drawing Sheets

(56) References Cited

U.S. PATENT DOCUMENTS

| | | | | |
|---|---|---|---|---|
| 2014/0150262 A1* | 6/2014 | Le Borgne | ............ | F01D 11/122 29/889.3 |
| 2014/0212273 A1* | 7/2014 | Le Borgne | ................ | F02K 3/06 415/119 |
| 2014/0367921 A1* | 12/2014 | Konigs | .................... | F01D 25/24 277/345 |
| 2015/0176423 A1* | 6/2015 | Cortequisse | .......... | F01D 25/246 415/119 |
| 2015/0233255 A1* | 8/2015 | Strock | ................... | F01D 11/122 60/805 |
| 2020/0308975 A1* | 10/2020 | Techer | .................. | F01D 11/125 |

FOREIGN PATENT DOCUMENTS

| | | | | |
|---|---|---|---|---|
| FR | 2339741 A1 | 8/1977 | | |
| WO | WO-9926775 A1 * | 6/1999 | ........... | B29C 70/467 |

OTHER PUBLICATIONS

International Search Report received for PCT Patent Application No. PCT/FR2017/051197, dated Sep. 15, 2017, 5 pages (2 pages of English Translation and 3 pages of Original Document).

* cited by examiner

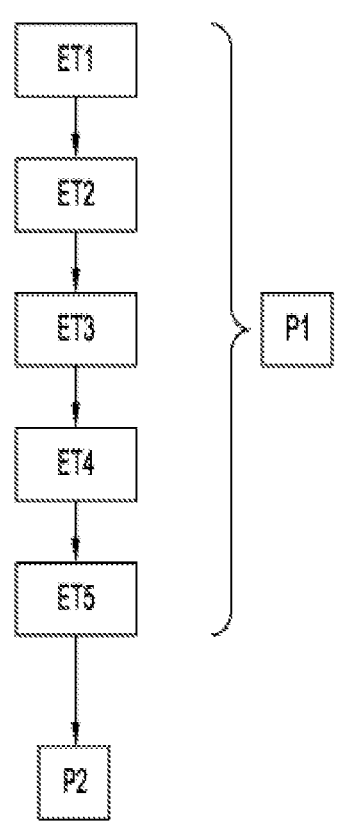
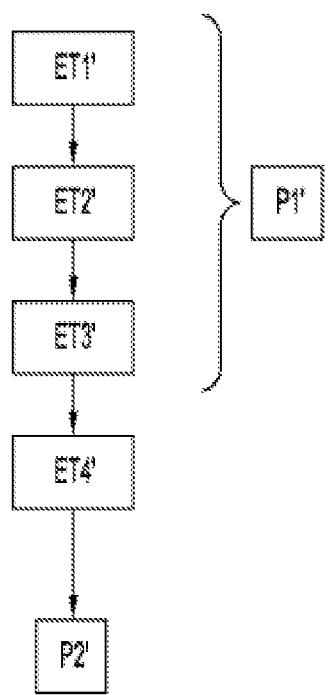
*Fig. 4*  *Fig. 6*

METHOD FOR MANUFACTURING AN ANNULAR CASING EQUIPPING A TURBOMACHINE

The invention relates to a method for manufacturing an annular casing equipped with an abradable material for a turbomachine.

Aircraft turbomachines are mainly made of at least one compressor, wherein air sucked in the air inlet of the turbomachine is compressed towards a combustion chamber, wherein fuel is injected and burned, and then transmitted to at least one turbine wherein the burnt gases are expanded to drive a compressor, rotationally-secured to the turbine, before being discharged by an ejection device. Compressors and aircraft turbines are constituted of fins, or blades, rotationally-driven inside an overall casing that ensures sealing of the air duct with the outside of the engine.

For example, the overall casing is constituted of an axial succession of annular casings, with which the blades form an operating clearance, each annular casing forming an axial segment of the inner wall of the air flow duct. The clearance between the blades and the annular casing must be sufficient to prevent friction from slowing down the rotation of the moving parts, but it must be controlled to avoid significant quantities quantity of gas from being turned away from the active surfaces of the blades. In order to ensure the highest possible efficiency, it is therefore important to control this clearance.

Indeed, it is known that the existing clearance between the ends of the mobile blades and the annular casing reduces the efficiency of the engine of the turbomachine. In particular, in the case of an annular casing of a compressor, the clearance can particularly change and downgrade the compressor's operations, until causing a "pumping" effect, which occurs when the air flow is diverted from the surfaces of the blades. The control of the air circulation at the ends of the blades is thus a key issue to obtain both the proper aerodynamic efficiency of the compressor or of the turbine and, in the particular case of a compressor, to have a sufficient margin against the pumping effect.

In a known manner, in order to control this clearance, the annular casing has an annular coating of abradable material, thereby forming an equipped casing. This coating, which is included inside the annular casing in the form of an abradable material, extends around and at a short radial distance from the blades that can, during operations, rub against the abradable material and wear it down via friction. This enables to optimise the radial clearances between the blades and the equipped casing that surrounds them, and therefore to reduce gas leakages at the tips or at the radially-external ends of the blades.

This coating can be deposited on a supporting tape secured to the casing, as is described in document EP-2.886.804-A1.

This coating can also be included in the annular casing in the form of an annular cartridge containing the abradable material.

The overall casing can therefore be achieved in the form of an axial succession, following the axis of the turbomachine, of annular casings, themselves carrying annular cartridges containing abradable material, thereby forming equipped casings.

Each annular cartridge of abradable material is not directly fixed to the corresponding bare annular casing. Indeed, each bare annular casing receives a collar supporting the abradable material. This collar is constituted of an annular block of honeycomb material covered by a rigid skin. Once assembled to the bare casing, it forms, with the latter, a carrying casing that comprises a collar and that is therefore able to ensure the support of the annular cartridge(s) of abradable material.

PRIOR ART

According to the prior art, the carrying casing is produced according to the three successive main steps of manufacturing a support collar, of machining the support collar, and of gluing the support collar in the bare casing to obtain a carrying casing.

During the first step of manufacturing the support collar, an annular block of honeycomb material is inserted in a skin preform made of an impregnated composite material, for example a preform made of carbon fibres impregnated with an epoxy resin.

Then, the assembly, which has a cross-section in the shape of a half-sandwich, is subjected to a simple cooking during a second step so as to form a raw support collar.

The inner surface of the bare annular casing does not necessarily correspond to the theoretical profile thereof. In particular, in the case of a bare casing made of a composite material that should theoretically have a circular cross-section, it has been observed that the inner face of the bare casing after manufacturing tended rather to have a shape that is not perfectly circular. Furthermore, the inner surface of the bare annular casing can have possible surface defects.

It is therefore necessary, in the method according to the prior art, to proceed with the machining of the outer peripheral face of the support collar, such that it fits at best with the inner face of the bare annular casing in order to minimise deformations that the support collar could undergo, or the position deviations that the support collar could undergo, with respect to the theoretical position thereof, as such deformations or such movements could have the consequence of changing the position required for the cartridge of abradable material that the carrying casing must receive.

Moreover, the outer face of the support collar is intended to be glued against the inner surface of the bare casing. The machining of the outer peripheral face of the support collar is as such all the more necessary as it enables to avoid a mismatch of the gluing surfaces of the support collar and the bare annular casing, which could lead to gluing defects.

To this end, during a third step, the inner face of the bare annular casing is measured so as to deduce from it, a three-dimensional profile that the outer peripheral face of the support collar must fit with. Then, during a fourth step, the support collar is placed in maintaining equipment and the outer peripheral face of the collar is machined according to a three-dimensional profile that corresponds that of the inner peripheral face of the bare annular casing. Then, in a fifth step, the support collar is glued in the bare annular casing to form a carrying casing.

These steps constitute the manufacturing steps of a carrying casing equipped with the collar thereof, constituting a first manufacturing phase of the equipped casing. Then, in a second manufacturing phase of the equipped casing, the cartridge of abradable materiel is glued in the carrying casing.

This design presents the disadvantage of requiring an operation whereby the inner peripheral face of the bare annular casing is measured with very high tolerance values, as the smallest defect of the shape of this inner peripheral face has consequences on the positioning of the support collar after the attachment thereof.

Moreover, the machining operation is moreover highly constraining, because of the equipment implemented for the achievement thereof. Indeed, once baked, the support collar must be positioned in specific equipment making it possible to clamp it during the machining thereof. This equipment is therefore voluminous and expensive.

To overcome these disadvantages, it is desirable to allow the machining of the block of honeycomb material, when such an operation is required, with reduced equipment and implementing lower tolerance values.

DESCRIPTION OF THE INVENTION

The purpose of the invention is therefore to simplify the manufacturing operations of the collar and the machining thereof in order to adapt it to the inner surface of the bare annular casing.

The invention achieves this purpose by manufacturing the collar directly inside the bare annular casing, i.e. by conducting, when this is necessary, the machining of the block of honeycomb material installed inside the bare annular casing, and the manufacturing of the collar by cooking a composite material by performing this operation also in the bare annular casing.

To this end, the invention proposes a method for manufacturing a carrying casing provided with a collar intended to carry at least one cartridge of abradable material for a turbomachine, said carrying casing comprising at least one bare annular casing and one block of material, particularly in honeycomb material, that comprises an outer face configured to be secured to an inner face of said bare annular casing, said block being covered with a skin able to carry said cartridge of abradable material, characterised in that it comprises successively:
 a step during which the outer face of the block is secured to the inner face of the bare annular casing,
 a step during which the circularity of an inner face of the block is monitored and during which, if necessary, the inner face of the block is machined to round,
 a step during which, simultaneously, said skin is produced and is secured to said block.

This manufacturing process makes it possible to avoid measuring the inner face of the bare annular casing, and to avoid performing a complex machining operation on the outer face of the block. The only machining performed, when it is necessary, is a very simple machining performed on the inner face of the block, which consists in a round machining.

According to other characteristics of the method:
 during the step whereby the skin is manufactured and secured, said block is covered with an impregnated composite material and said composite material is polymerised on said block to obtain said skin while securing it to the block,
 during the step whereby the skin is manufactured and secured, the bare annular casing, the block and the composite material are arranged together in a cooking device simultaneously enabling the polymerisation of the composite material and the attachment thereof to the block,
 during the step whereby the skin is manufactured and secured, the cooking means implemented is an autoclave enclosure,
 during the step whereby the skin is manufactured and secured, a woven and impregnated composite material is used to drape the block,
 during the step whereby the skin is manufactured and secured, at least one other element is secured to the carrying casing,
 during the first step, a block of honeycomb material with a constant thickness is used.

The invention also relates to a carrying casing supporting at least one cartridge of abradable material for a turbomachine, comprising at least one bare annular casing with a non-circular cross-section extending over at least one part of the axial length thereof and one block of material, particularly in honeycomb material, that comprises an outer face glued to an inner face of said bare annular casing and covered with a skin able to carry said cartridge of abradable material, characterised in that the inner face of the block is round-machined.

The invention also relates to a method for manufacturing an equipped annular casing of a turbomachine, characterised in that it comprises a first phase for manufacturing a carrying casing according to the method described above and a second phase, during which an annular cartridge of abradable material is glued inside said carrying casing.

The invention finally relates to an equipped casing obtained according to this method.

The invention will be better understood and other details, characteristics and advantages of the present invention will more clearly appear upon reading the following description, provided as an example and not limited thereto, and with reference to the appended drawings, in which:

FIG. 4 is a flowchart representing all the phases of the method for manufacturing the equipped casing of FIG. 1;

Figure 5A:
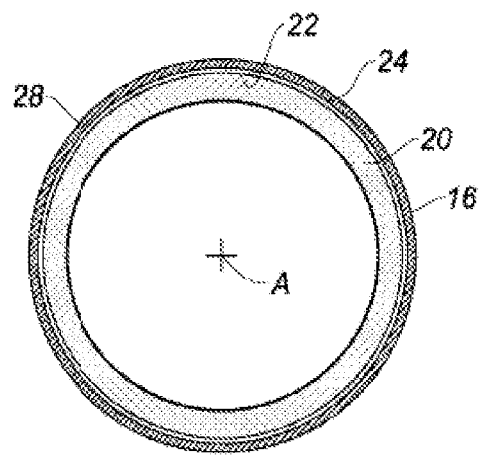
Figure 5B:
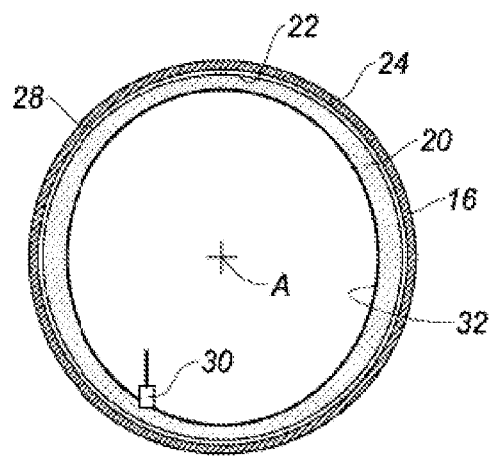
Figure 5C:
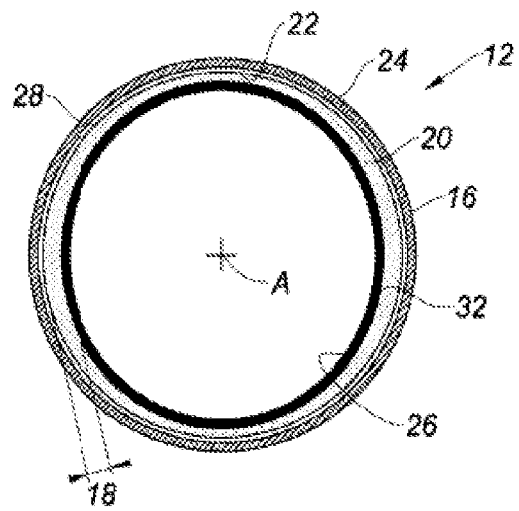

FIGS. 5A, 5B, and 5C are schematic views representing the three manufacturing phases of a carrying casing according to the invention;

FIG. 6 is a flowchart representing all the phases of a method for manufacturing an equipped casing according to the invention.

In the following description, identical reference numbers describe identical parts, or parts with similar functions.

In the following description, the "inner" and "outer" orientations are defined in reference to an axis of rotation of the rotors of a turbomachine, the "outer" orientations being turned in the direction opposite said axis, and the "inner" orientations being turned towards said axis.

Figure 1:
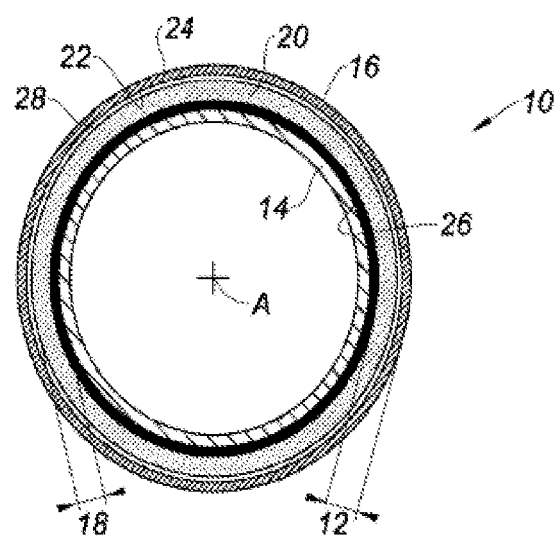
FIG. 1 is a schematic cross-sectional view of an equipped casing of a turbomachine according to the prior art.

FIG. 1 represents an equipped annular casing 10 for a turbomachine. In a known manner, the equipped annular casing 10 is constituted of a plurality of annular elements that are concentric and coaxial with respect to an axis A of the turbomachine, the axis A corresponding, for example, to an axis of rotation of the rotors (not represented) of the turbomachine. Thus, the equipped casing 10 is constituted, from the outside towards the inside, of a carrying casing 12 equipped with a collar receiving an annular cartridge 14 of abradable material that determines a gas duct of said turbomachine. More particularly, the carrying casing 12 is formed by a bare casing 16 receiving internally a support collar 18. The support collar 18 is therefore configured to receive internally the annular cartridge 14 of abradable material.

In a known manner, the support collar 18 is constituted of a block 20 of honeycomb material comprising an outer face 22 configured to be secured to the inner face 24 of said bare annular casing 16 and covered by a skin 26.

The skin 26 is generally, but in a non-limiting manner of the invention, a skin 26 made of a composite material achieved by cooking a skin preform (not represented) of resin-impregnated composite material, for example woven carbon fibres impregnated with epoxy resin.

Also in a known manner, the outer face 22 of the block 20 of honeycomb material, which also corresponds to the outer face 22 of the support collar 18, is secured to the inner face 24 of the bare annular casing 16, via a film of glue 28.

In a first phase P1 of a method for manufacturing an equipped casing 10 according to a known method of the state of the art, the collar 18 is manufactured, then the carrying casing 12 is manufactured by assembling the collar 18 to the bare casing 16 and, in a second phase P2, the abradable material 14 is assembled to the carrying casing 12 to achieve an equipped casing 10.

Figure 2A:
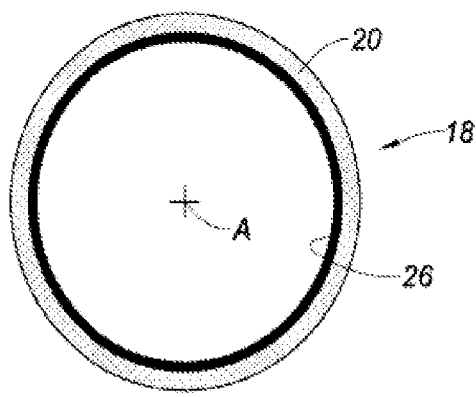
FIGS. 2A and 2B are schematic views representing the steps of a method to manufacture a support collar for the equipped casing in FIG. 1, and being part of the first phase of a method for the manufacturing of the equipped casing of FIG. 1.
Figure 2B:
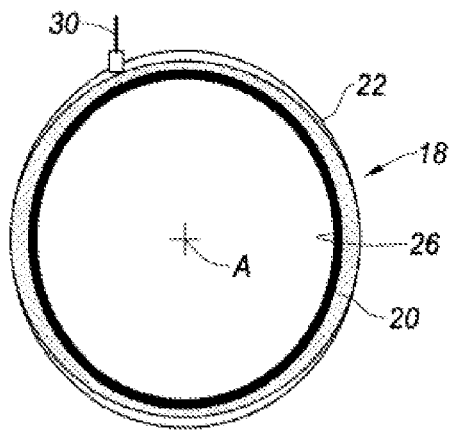
Figure 3:
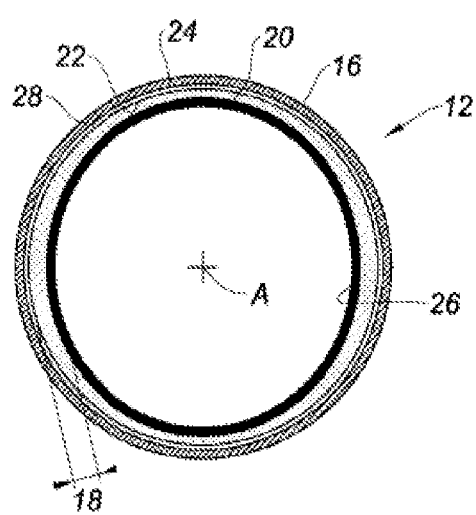
FIG. 3 is a schematic view of a manufacturing step of a carrying casing, being part of the first phase of a method for the manufacturing of the equipped casing of FIG. 1.

Thus, as represented in FIGS. 2A to 3, the method begins, during a first phase, the steps of which are represented in FIGS. 2A and 2B, by manufacturing the support collar 18.

As shown in FIG. 4, the manufacturing of the support collar 18 starts with a first step ET1, during which a block 20 of honeycomb material, also called "Nida", is inserted in a skin preform made of an impregnated composite material, this assembly being preferably maintained in a suitable mould (not represented) in order to avoid it deforming. Then, in a second step ET2, this assembly is cooked. The result is a raw collar 18, such as that represented in FIG. 2A.

Following this step ET2, the skin preform of composite material has become a rigid skin 26, such as that represented in FIG. 2A. The block 20 of honeycomb material and the skin 26 are adhered to one another following the cooking of the composite material.

Moreover, the inner surface 24 of the bare casing 16 previously represented in FIG. 1 does not necessarily correspond to the theoretical profile thereof. In particular, in the case of a rotating bare casing 16 made of a composite material, it has been observed that the inner face 24 of the bare casing 16 after manufacturing tended to have a shape that is not perfectly circular, instead of the circular shape theoretically required, which is adapted to receive without significant leaks, a compressor wheel, or a turbine wheel of the turbomachine (not represented). Furthermore, the inner face 24 of the bare casing 16 can have possible surface defects.

Upon completion of step ET2, insofar as the general shape of the rigid skin 26 must not be modified, as it must have a nominal minimum thickness, it is necessary to machine the outer peripheral face 22 of the support collar 18, such that it fits with the inner peripheral face 24 of the bare casing 16, in order to minimise, on the one hand, the deformations that the support collar 18 may undergo with respect to its theoretical profile, and on the other hand, the positioning deviations of the support collar 18 with respect to the axis A of the turbomachine once it is mounted in the bare annular casing 16. Indeed, such deformations and positioning deviations could consequently change the position required for the support collar 18, and consequently for the cartridge of abradable material 14 that the support collar 18 must receive.

To this end, as shown in FIG. 4, during a third step ET3 (not represented), the dimensions of the inner peripheral face 24 of the bare casing 16 are measured to deduce from it, a three-dimensional profile that the outer peripheral face 22 of the support collar 18 must fit with, this peripheral face 22 also corresponding to the outer peripheral face 22 of the block 20 of honeycomb material.

Then, during a fourth step ET4, the support collar 18 is placed in equipment (not visible) adapted to maintain it in position and, as represented in FIG. 2B, the outer peripheral face 22 of the support collar 18 is then machined to a three-dimensional profile corresponding to that of the inner peripheral face 24 of the bare casing 16, for example by using a two-size end mill 30.

Then, during a fifth step ET5, the support collar 18 is glued in the bare annular casing 16 via the film of glue 28 to obtain the carrying casing 12.

The first to fifth steps ET1 to ET5 of the methods for manufacturing the support collar 18 and the carrying casing 12 with the collar 18 thereof, comprising in particular the steps ET1 and ET4, represented in FIGS. 2A and 2B, constitute a first phase P1 of the method for manufacturing the equipped casing 10 with the abradable material. Then, in a second phase P2 for the manufacturing of the equipped casing represented in FIG. 4, the cartridge of abradable material 14 is glued in the carrying casing 12 of FIG. 3 so as to obtain the equipped casing 10, such as represented in FIG. 1.

This design has the disadvantage of requiring a measuring operation of the inner peripheral face 24 of the bare annular casing 16 with very high tolerance values, since any defect of the shape of this inner peripheral face 24 could have consequences on the positioning of the support collar 18 after the attachment thereof and on the quality of the bond between the inner face 24 of the bare casing 16 and of the collar 18. It is therefore consequently necessary to minimise such defects maximally.

Moreover, the machining operation is highly constraining, because of the equipment implemented for the achievement thereof. Indeed, once cooked, the support collar 18 must be positioned in specific equipment enabling to clamp it during machining operations, as it can naturally not be machined in the absence of a support. This equipment is therefore voluminous and expensive.

To overcome this disadvantage, it is desirable to allow the manufacturing of the support collar 18 by enabling the machining of the block of honeycomb material with a reduced specific equipment, and even in the absence of specific equipment, and implementing lower tolerance values.

For this purpose, the invention proposes a method for manufacturing the support collar 18 in the absence of specific equipment.

To this end, the invention advantageously proposes a method for manufacturing the support collar 18 that is integrated to the method for manufacturing the carrying casing 12, the support collar 18 being realised at the same time as the carrying casing 12.

For this purpose, as shown in FIG. 5A to 5C, the method for manufacturing the carrying casing 12 comprises successively a step during which the outer face 22 of the block 20 is glued to the inner face 24 of the bare annular casing 16, then a step during which the circularity of the inner face of the block 20 is monitored and during which, if necessary, this inner face 32 of the block 20 is round-machined, and finally a step whereby, the skin 26 is manufactured and simultaneously secured to the block 20.

As shown in FIG. 6, the manufacturing of the carrying casing 12 starts with a first step ET1', during which the block 20 of honeycomb material or "Nida" is inserted directly in the bare annular casing 16, as represented in FIG. 5A. In particular, the peripheral outer face 22 of the block 20 of honeycomb material is raw and is therefore not machined, and is glued in the raw form thereof via the film of glue 28. During this first step ET1' a block 20 of honeycomb material with a constant thickness is used.

The honeycomb material of the block 20 is relatively flexible and fits with the profile of the inner face 24 of the bare annular casing 26.

Then, during a second step ET2', the block 20 of honeycomb material is glued, for example by cooking.

Then, during a third step ET3', the circularity of the inner face 32 of the block 20 is monitored.

If the bare annular casing 16 is perfectly circular, the block 20 of honeycomb material is also, in theory, perfectly circular and should therefore not require any additional machining operations. However, it is possible to consider machining operations as a precautionary measure.

On the contrary, if necessary, the inner face 32 of the block 20 is machined to round, as represented in FIG. 5B. This machining is, for example, performed using two-sized end mills 30, and consists in conferring the inner face 32 of the block 20 a perfectly circular cross-section over the entire axial length thereof.

As can be seen, the method according to the invention is particularly advantageous in that it enables to avoid the machining of the outer peripheral face 22 of the block 20 of honeycomb material.

A first consequence of this configuration is that, the block 20 of honeycomb material being maintained by the bare casing 16, it is not necessary to place the block 20 in specific equipment, as the bare casing 16 secures and maintains the block during machining operations using the end mill 30. This configuration enables to do without such equipment, and consequently reduces to total duration of the manufacturing method by the time necessary to place the block in this equipment and to remove it therefrom.

A second consequence of this configuration is that, the machining of the inner face 32 of the block 20 being a round machining, it is not necessary, as was the case with the methods according to the prior art, to perform a measurement of the inner face 24 of the bare casing 16. The only condition to abide by when machining to round the inner face 32 of the block 20 is a coaxial condition with respect to the axis A of the turbomachine.

At the end of this step ET3', the bare casing 16 is provided with the block 20 of honeycomb material, but does not yet constitute a carrying casing 12, as the collar 18 is not constituted, since the block 20 of honeycomb material is not covered with the skin 26.

Thus, unlike the carrying case 12 according to the prior art, the carrying casing 12 according to the invention, when the bare annular casing 16 thereof does not have an inner face 24 having a perfectly circular cross-section over at least one part of the axial length thereof, comprises a block 20 of which the inner face 32 is round-machined to comply with the circularity constraint.

Then, during a fourth step ET4', the skin 26 is simultaneously manufactured and secured in the block 20.

For this purpose, in a preferred embodiment of the invention, the block 20 is preferably covered with an impregnated composite material and said composite material is polymerised on the block 20 to obtain the skin 26, while securing it to the block 20.

The result is a carrying casing 12, such as represented in FIG. 5C.

It will be noted, that according to the method, the collar 18, constituted of a block 20 of an elastomer material and the skin 26, is manufactured at the same time as being secured to the carrying casing 12.

Preferably, during this fourth step, the cooking of the impregnated composite material constituting the skin 26 is not realised independently. The bare annular casing 16, the block 20 of honeycomb material and the composite material of the skin 26 are placed together in a cooking device that enables simultaneously, through the increase of temperature it induces, the polymerisation of the composite material, thereby securing it to the block 20.

Preferably, for the manufacturing of the skin 26, a woven and impregnated composite material is used to drape the block 20 of honeycomb material.

For information purposes, during the fourth cooking step, the cooking is carried out at a temperature of 150° C.

From this fourth step, the impregnated composite material has become a rigid skin 26, capable of receiving a cartridge of abradable material. The block 20 of honeycomb material and the skin 26 are adhered following the cooking of the composite material and form a support collar 18 integrated in the carrying casing 12.

The first to fourth steps ET1' to ET4' of the method for manufacturing a carrying casing 12 constitute the first phase P1' of the method for manufacturing the equipped casing 10. Then, during a second phase P2', represented in FIG. 6, the cartridge 14 of abradable material is glued to obtain the equipped casing represented in FIG. 1, this gluing operation being also achievable by cooking.

The bare annular casing 16 implemented in the method can be a casing of any known type according to the prior art. However, preferably, the bare annular casing 16 is a casing made of composite material also obtained beforehand by cooking a preform made of composite material.

The composite material of the skin 26 being only capable of withstanding a limited number of cooking cycles, it will be understood that, advantageously, the cooking cycle thereof is provided to coincide with a step whereby another element is secured to the carrying casing 12.

Thus, during the step ET4', the cooking cycle can be used to secure another element to the carrying casing 12. For example, the cooking cycle can be used to secure to the bare annular casing 16 a thermal protection element made of fibreglass, also known as "glass wool", that provides local thermal protection to the bare casing 16. It is also possible to secure to the outer surface of the bare annular casing 16 panels of sound insulation, or attachment elements enabling to secure members and ducts on the outer surface of the bare casing 16.

Thus, as seen above, the manufacturing of an equipped casing 10 according to the invention comprises a first phase P1' of four steps ET1', ET2', ET3', ET4' followed by a second phase P2', i.e. a total of five operations, while according to the prior art, the equipped annular casing 10 was obtained upon completion of a first phase P1' of five steps ET1', ET2', ET3', ET4', ET5' followed by a second phase P2', i.e. a total of six operations. It consequently results from this a significant time gain in the context of a large-scale production, not only because of the reduction of the number of operations, but also because of the reduced complexity thereof.

The invention therefore applies to any equipped annular casing 10 of a turbomachine, and in particular to any equipped annular casing 10 comprising a bare annular casing 16 made of a composite material.

The invention claimed is:

1. Method for manufacturing a carrying casing provided with a collar intended to carry at least one cartridge of abradable material for a turbomachine, said carrying casing comprising at least one bare annular casing and one block of material that comprises an outer face configured to be secured to an inner face of said bare annular casing, said block being covered with a skin able to carry said cartridge of abradable material, said block and said skin forming said collar, wherein the method comprises successively:
- a step (ET1') during which the outer face of the block is secured to the inner face of the bare annular casing,
- a step (ET2') during which the circularity of an inner face of the block is monitored and during which, if necessary, the inner face of the block is round-machined,
- a step (ET4') during which, simultaneously, said skin is produced and is secured to said block.

2. The method according to claim 1, wherein during the step (ET4') whereby the skin is produced and is secured to the block, said block is covered with an impregnated composite material and said composite material is polymerised on said block to obtain said skin while securing it to the block.

3. The method according to claim 2, wherein during the step (ET4') whereby the skin is produced and is secured to the block, the bare annular casing, the block and the composite material are arranged together in a cooking device simultaneously enabling the polymerisation of the composite material and the attachment thereof to the block.

4. The method according to claim 3, wherein during the step (ET4') whereby the skin is produced and is secured to the block, the cooking device implemented is an autoclave enclosure.

5. The method according to claim 3, wherein during the step (ET4') whereby the skin is produced and is secured to the block, a woven and impregnated composite material is used to drape the block.

6. The method according to claim 3, wherein during the step (ET4') whereby the skin is produced and is secured to the block, at least one other element is secured to the carrying casing.

7. The method according to claim 1, wherein during the first step (ET1'), a block of honeycomb material with a constant thickness is used.

* * * * *